United States Patent [19]

Serini et al.

[11] Patent Number: 4,786,708
[45] Date of Patent: Nov. 22, 1988

[54] USE OF FILMS OF POLYCONDENSATES

[75] Inventors: Volker Serini; Bernhard Schulte; Claus Burkhardt; Dieter Freitag, all of Krefeld; Uwe Hucks, Alpen; Werner Waldenrath, Cologne; Hans-Leo Weber, Rommerskirchen, all of Fed. Rep. of Germany

[73] Assignee: Bayer Aktiengesellschaft, Leverkusen, Fed. Rep. of Germany

[21] Appl. No.: 43,973

[22] Filed: Apr. 29, 1987

[30] Foreign Application Priority Data

May 10, 1986 [DE] Fed. Rep. of Germany ....... 3615764

[51] Int. Cl.$^4$ .............................................. C08G 63/64
[52] U.S. Cl. .................................... 528/176; 528/179; 528/193; 528/194; 428/215; 428/910

[58] Field of Search ................ 428/215, 910; 528/176, 528/179, 193, 194

[56] References Cited

U.S. PATENT DOCUMENTS

| 4,436,894 | 3/1984 | Urasaki et al. | 528/176 |
| 4,599,262 | 7/1986 | Schulte et al. | 428/215 |
| 4,654,411 | 3/1987 | Serini et al. | 528/176 |

Primary Examiner—Morton Foelak
Assistant Examiner—Samuel A. Acquah
Attorney, Agent, or Firm—Connolly & Hutz

[57] ABSTRACT

Films from aromatic polyesters and from aromatic polyestercarbonates are excellently suitable as electrically insulating films, for example as dielectric for capacitors and as conductor track films.

6 Claims, No Drawings

USE OF FILMS OF POLYCONDENSATES

The subject of the invention is the use of films of polycondensates as electrically insulating films, characterized in that the polycondensates contain 75-100 mol-% of bifunctional structural units of the formulae (1) and optionally (2)

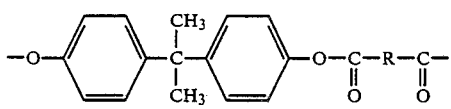 (1)

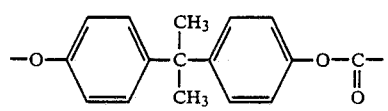 (2)

and 25-0 mol-% of bifunctional structural units of the formulae (3) and optionally (4)

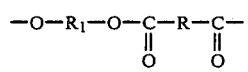 (3)

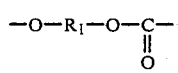 (4)

where the acid radicals —CO—R—CO— in the formulae (1) and (3) denote 75-100 mol-% of tere- and/or isophthalic acid radicals and to 25-0 mol-% of radicals of other aromatic dicarboxylic acids and the radicals —O—$R_1$—O— in the formulae (3) and (4) denote radicals of diphenols other than the 2,2-bis(4-hydroxyphenyl)propane radicals contained in formulae (1) and (2), and the molar ratio of ester groups to carbonate groups in the polycondensates is 100/0 to 10/90.

The radical —O—$R_1$—O— in the formulae (3) and (4) is based for example on the following diphenols HO-$R_1$-OH:
hydroquinone,
resorcin,
dihydroxydiphenyls,
bis(hydroxyphenyl)alkanes with the exception of bisphenol A,
bis(hydroxyphenyl)cycloalkanes,
bis(hydroxyphenyl) sulphides,
bis(hydroxyphenyl) ethers,
bis(hydroxyphenyl) ketones,
α, α'-bis(hydroxyphenyl)diisopropylbenzenes,
and also their ring-halogenated and ring-alkylated compounds. These and other suitable diphenols are, for example, described in the monograph by Hermann Schnell, Chemistry and Physics of Polycarbonates, New York, Interscience Publishers 1964, Polymer Reviews, Vol. 9, the publication by V. Serini, D. Freitag ard H. Vernaleken, Polycarbonates from o,o,o',o'-tetramethyl substituted bisphenols, Angew. Makromol.- Chem. 55 (1976) 175-189 and the Deutsche Offenlegungsschriften (German Published Specifications) 2,063,050, 2,211,957, 2,615,038 and 2,248,817.

Preferably the radical —O—$R_1$—O— is based on the following diphenols HO—$R_1$—OH:
hydroquinone,
resorcin,
bis(4-hydroxydiphenyl),
bis(4-hydroxyphenyl)methane,
2,2-bis(4-hydroxyphenyl)butane,
1,1-bis(4-hydroxyphenyl)cyclohexane,
bis(4-hydroxyphenyl) sulphide,
bis(4-hydroxyphenyl) ether,
bis(4-hydroxyphenyl) ketone,
α,α'-bis(4-hydroxyphenyl)-p-diisopropylbenzene,
2,2-bis(3,5-dimethyl-4-hydroxyphenyl)propane,
2,2-bis(3,5-dimethyl-4-hydroxyphenyl)methane,
2,2-bis(3,5-dimethyl-4-hydroxyphenyl)butane,
2,2-bis(3,5-dibromo-4-hydroxyphenyl)propane and
2,2-bis(3,5-dichloro-4-hydroxyphenyl)propane.

Particularly preferred diphenols HO—$R_1$—OH are hydroquinone,
bis(4-hydroxydiphenyl),
bis(4-hydroxydiphenyl) sulphide,
bis(4-hydroxydiphenyl) ether,
2,2-bis(3,5-dimethyl-4-hydroxyphenyl)propane,
2,2-bis(3,5-dichloro-4-hydroxyphenyl)propane and
2,2-bis(3,5-dibromo-4-hydroxyphenyl)propane.

Aromatic dicarboxylic acids other than tere- and isophthalic acid which form the basis of the acid radicals —CO—R—CO— of the formulae (1) and (3) are, for example,
o-phthalic acid,
monochloroterephthalic acid,
2,5-dichloroterephthalic acid,
4,4'-dicarboxydiphenyl ether,
diphenylmethane-4,4'-dicarboxylic acid,
diphenyl-4,4'-dicarboxylic acid,
naphthalene-1,4-dicarboxylic acid,
naphthalene-1,8-dicarboxylic acid.

Both the diphenols HO—$R_1$—OH and also the aromatic dicarboxylic acids other than tere- and isophthalic acid can be used individually or as mixtures in addition to the 2,2-bis(4-hydroxyphenyl)propane and the tere- and/or isophthalic acid.

The films to be used according to the invention are based on polycondensates which contain preferably 10-mol-% and particularly preferably 0 mol-% of bifunctional structural units of the formulae (3) and (4).

The films to be used according to the invention are based on polycondensates in which the acid radicals —CO—R—CO— consist preferably of 90-100 mol-% and particularly preferably of 100 mol-% of tere- and/or isophthalic acid units.

In the polycondensates which form the basis of the films to be used according to the invention, the tere-/isophthalic acid radical ratio may be 100/0 to 0/100. If the molar ratio of ester to carbonate groups in the polycondensates which form the basis of the films to be used according to the invention is less than or equal to 1/1, the terephthalic acid/isophthalic acid radical ratio is preferably at least 10/90, more preferably at least 40/60, most preferably at least 60/40, in particular at least 80/20 and specially 100/0.

If the molar ratio of ester to carbonate groups in the polycondensates which form the basis of the films to be used according to the invention is greater than 1/1, the terephthalic acid/isophthalic acid radical ratio is preferably 97/3 to 3/97, particularly preferably 93/7 to 15/85, quite particularly preferably 80/20 to 35/65 and in particular 70/30 to 50/50.

In the polycondensates which form the basis of the films to be used according to the invention, the molar ratio of ester to carbonate groups is preferably 99/1 to 10/90, particularly preferably 98/2 to 20/80, quite particularly preferably 97/3 to 40/60, with 95/5 to 65/35 being better, and in particular 90/10 to 80/20.

Polycondensates which form the basis of the films to be used according to the invention are understood to mean also any mixtures of at least two polycondensates from the series comprising the aromatic polycarbonates, polyesters and polyestercarbonates, provided they satisfy the requirements imposed in the introduction on the nature and ratio of the bivalent structural units.

Thus, for example, mixtures of aromatic polycarbonates and aromatic polyesters, mixtures of aromatic polyesters and aromatic polyestercarbonates, mixtures of aromatic polycarbonates and aromatic polyestercarbonates, and also mixtures of aromatic polyestercarbonates of different polycarbonate content can be used, the preference increasing in the above sequence. Most strongly preferred, however, are polycondensates whose composition is fixed by the synthesis and which are therefore not obtainable by subsequent mixing.

The films to be used according to the invention may be both extruded films and cast films. The use of cast films, however, represents a preferred embodiment of this invention. Extruded films are understood to mean films which are drawn from the melt of the polycondensate, e.g. via slit nozzles or else via annular nozzles as in blowforming. Cast films are understood to mean films which are produced by pouring a polycondensate solution on a substrate and evaporating the solvent.

The polycondensates which may be employed for the extruded films which can be used according to the invention have relative viscosities of 1.20–1.80, preferably of 1.25–1.60, particularly preferably of 1.30–1.45 (measured at $c=5$ g/l and 25° C. in phenol/o-dichlorobenzene 1/1 parts by weight).

The polycondensates which can be employed for the cast films which can be used according to the invention have relative viscosities of 1.20–5.0, preferably of 1.25–4.0, particularly preferably of 1.50–3.5, in particular of 1.7–3.0 and particularly of 2.0–2.5 (measured at $c=5$ g/l and 25° C. in methylene chloride).

While the extruded films which can be used according to the invention have thicknesses of 0.5–1,000 $\mu$m, preferably 2–600 $\mu$m, particularly preferably 5–300 $\mu$m and quite particularly preferably of 10–200 $\mu$m, the cast films have thicknesses of 0.1–800 $\mu$m, preferably of 1.0–600 $\mu$m, particularly preferably of 2.0–400 $\mu$m and quite particularly preferably of 3.0–200 $\mu$m.

The polycondensates which can be employed to prepare the films to be used according to the invention can be prepared by various processes such as e.g. by various melt transesterification processes, by preparation processes in homogeneous solution and by the two-phase interface process. In this connection, various derivatives of the aromatic dihydroxy compounds and aromatic dicarboxylic acids and of carbonic acid can be employed as monomers, such as e.g. bischlorocarbonic acid esters, bis-acid chlorides, phosgene, dicarboxylic acid diphenyl esters, diphenyl carbonate and others.

Preferably, the polycondensates which can be employed for the films to be used according to the invention are prepared by a two-phase interface process. Thus, for example, an aromatic polyester carbonate can be prepared from 2,2-bis(4-hydroxyphenyl)propane and optionally further aromatic dihydroxyl compounds, a mixture of tere- and isophthalic acid dichlorides and optionally further dicarboxylic acid dichlorides, and also phosgene as monomer. For this purpose, for example, dihydroxyl compounds and a phenol as chain limiter are dissolved in aqueous alkali. To this solution are added one or more organic solvents, e.g. halogenated hydrocarbons, and the dicarboxylic acid chlorides dissolved in the said solvent are added while stirring. Subsequent thereto the required quantity of phosgene is added while stirring. Then a tertiary amine is added as catalyst and stirring is continued for some time. The polyestercarbonate formed can then be isolated from the organic phase to be separated.

As chain limiters, use can be made of a whole series of condensable monofunctional compounds or their derivatives, such as phenols like e.g. phenol, o-, m-, p-cresol, p-tert-butylphenol, p-isooctylphenol, carboxylic acids like e.g. benzoic acid, secondary amines like e.g. methylaniline, and others, as described in the literature on aromatic polyesters and polyestercarbonates. Derivatives of the phenolic compounds are, for example, chlorocarbonic acid esters and phenyl carbonates, derivatives of the acids, for example, acid chlorides and phenyl esters. The phenols, in particular p-isooctylphenol, are preferred.

As catalysts use is in general made of tertiary amines like e.g. triethylamine, tripropylamine, tributylamine and N-ethylpiperidine, or phase-transfer catalysts like, for example, quaternary ammonium compounds or phosphonium compounds. These and other catalysts are described in detail in the literature on the preparation of aromatic polyesters and polyestercarbonates.

As solvents, use is in general made of chlorinated hydrocarbons of an aliphatic or aromatic nature and mixtures thereof like e.g. methylene chloride and methylene chloride/chlorobenzene mixtures; preferably, methylene chloride is used.

During the condensation, the pH is in general kept at over 7, in particular between 8 and 14. The temperature is in general below the boiling point of the organic solvents, preferably at about 10°–50° C. The process can be manifoldly varied, for example by altering the sequence and the instant in time when the reactants and catalyst are added, by employing more than one catalyst, by altering the pH, the temperature, the stirring conditions and other factors in addition.

The polycondensates to be used according to the invention may contain the ester and the carbonate units distributed more or less in block form or statistically, depending on the nature of the preparation process. In addition, they may be branched if branching polyfunctional compounds are also incorporated in the polycondensation reaction. Such polyfunctional compounds are manifoldly described in the polyester and polyestercarbonate literature.

The preparation of the polycondensates to be used according to the invention by mixing one or more polycondensates which are mentioned above is performed via the combined solution of said polycondensates or via their melt. Surprisingly, it was found that by conducting the two-phase interface process in a special manner in the preparation of polyestercarbonates employable for the films according to the invention with the relative viscosities of 1.7–3.0, preferably of 2.0–2.5 (measured at $c=5$ g/l and 25° C. in methylene chloride) polyesters can be prepared which are particularly suitable for films. Films prepared from these polyestercarbonates exhibit in particular more favourable elongations at break, higher draw ratios when stretched and fewer breaks at high draw ratios than corresponding polyestercarbonates prepared in the usual manner.

The conducting of the two-phase interface process in a special manner in the preparation of these polyester-carbonates particularly suitable for films implies the use of three reactors succeeding each other which effect the mixing of the two-phase mixture and in which the polycondensation reaction is continuously performed. For example, the following reactors effecting the mixing of the two-phase mixture can be employed as reactors: stirred vessels, loop reactors, rotor-and-stator systems, nozzle-type reactors and others in addition.

In this connection, the diphenols, dissolved as diphenolates in an alkaline aqueous phase, and the acid chlorides, dissolved in a chlorinated hydrocarbon or a mixture of chlorinated hydrocarbons, are simultaneously and continuously fed into the first reactor. Preferably, methylene chloride/chlorobenzene mixtures are employed as solvent, particularly preferably methylene chloride. The two-phase mixture continuously discharged from the first reactor and also phosgene, optionally alkali-metal hydroxide and optionally additional solvent, are simultaneously and continuously fed into a second reactor. The two-phase mixture discharged from the second reactor and optionally further alkali-metal hydroxide are continuously fed into a third reactor. The two-phase mixture continuously emerging from the third reactor is separated, the organic phase is washed in the absence of electrolyte and the polyestercarbonate is extracted by spray drying, evaporation extrusion, precipitation/drying or evaporation kneading. At least some of the phosgene used in total can be fed also into the first reactor. The catalyst can be fed continuously into one or into several of the reactors. Preferred as catalysts are tertiary amines. These are preferably fed into the third reactor. Optionally employed chain limiters can be fed continuously into one or more reactors, but preferably it is introduced into the first reactor.

The preparation of the extruded films which can be used according to the invention from the polycondensates is performed via the melt of the polycondensates, e.g. via slot nozzles or else via annular nozzles as in blow forming.

The preparation of the preferred cast films which can be used according to the invention from the polycondensates is performed via their solution in organic solvents. Suitable solvents are, in particular, chlorinated hydrocarbons like e.g. methylene chloride, ethylene chloride, chloroform and chlorobenzene, or mixtures thereof. Preferred are methylene chloride/chlorobenzene mixtures and, in particular, methylene chloride. Additions of, for example, methanol, ethanol, acetone, toluene, xylene, ethylene glycol and its mono- or diethers, propylene glycol and its ethers, glycerol, lauryl alcohol and its esters or phthalic acid esters can also be used at the same time. Such additions as, for example, toluene, ethers of propylene glycol or ethylene glycol are preferred.

The pouring of the polycondensate solutions to film thicknesses of 0.1–800 μm, preferably of 1–600 μm, particularly preferably of 2–400 μm and quite particularly preferably of 4–200 μm can be performed on strip or drum casting machines with known casters like stripper casters or pressurized casters. Thus, for example, methylene chloride polycondensate solutions can be poured onto thermostatic rolls which may be matt or polished and which in general have temperatures of 10°–40° C. The evaporation of the methylene chloride takes place largely on the drum roll; residual solvent is then removed by means of further thermostatic rolls, in a circulating-air dryer by means of heating surfaces like IR radiator systems, or other heating arrangements and also at higher temperatures, e.g. of 80°–150° C. Residual traces of solvent can be removed by further after-baking, optionally at still higher temperature. The film casting speeds can be varied and in the case of drum rolls of 1–5 m diameter are in general 2–4,000 m/sec., preferably 20–2,000 m/sec.

The polycondensate cast films which can be used according to the invention can be stretched mono- or biaxially on industrial stretching equipment, monoaxial stretching in the longitudinal direction, i.e. in the casting direction of the cast film, being preferred. For this purpose, known industrial stretching machines equipped with thermostattable rolls are suitable, the stretching being performed in a single-nip stretching system, i.e. between a heated roll (1) with the feed velocity $V_1$ and a heated roll (2) with the maximum temperature, the socalled stretching temperature, and a delivery velocity $V_2$ in a nip of approx. 3 to 10 mm width with the draw ratio $V_1:V_2$ being varied from 1:1.05 to 1:3.5, preferably from 1:1.1 to 1:3.0 and in particular from 1:1.2 to 1:2.5. In general, a third roll with a temperature lower than the stretching temperature is added for heat setting.

The stretching process can also be performed in a multiple-nip system, stretching machines with several driven rolls of different velocity and temperature being used and nondriven heated rolls being employed within the stretching zones for the purpose of smoothing out the stretching process. The diameter of the rolls can be varied from e.g. 40 to 300 mm, the surface of the stretching rolls in general being roughened up by blasting or rolls clad with plastic-material or ceramic being used for better adhesion. The temperature of the most highly heated stretching roll is termed the so-called stretching temperature $T_R$ which is varied in the range from approx. 170° to 300° C., preferably from 190° to 300° C.

As a result of stretching the films to be used according to the invention a whole series of properties such as e.g. the shrinkage behaviour at higher temperature, mechanical and electrical properties, e.g. tear strength and dielectric strength and others in addition can be advantageously altered.

Surprisingly, it was found that the dielectric strength of electrically insulating films based on the polycondensates to be used according to the invention is particularly high, even with relatively high residual salt contents. In addition, the electrical dielectric strength remains constant even with rising temperature, whereas in general the dielectric strength of electrically insulating films decreases considerably with rising temperature. The films are, moreover, highly transparent, exhibit a very high heat deflection temperature, good chemical resistance, a high surface quality and stability to thermal oxidation.

The high electrical dielectric strength, in particular also at elevated temperatures, and also the constancy of the dielectric constant with temperature make the films to be used according to the invention particularly suitable for the production of very small electrical and electronic components in which high temperatures are known to occur frequently. Components produced from the films to be used according to the invention are also able to withstand high temperature loads such as occur, for example, in engine compartments in motor vehicles. These properties suggest, in particular, a use as dielectric in capacitors.

The constancy of the dielectric constant with temperature of the films to be used according to the invention, on the other hand, is extremely useful for use as conductor-track films. In conductor-track films the film between the conductor tracks affects the circuit in a similar manner as a capacitor, i.e. even the conductortrack film without components has a finite capacity with the conductor tracks deposited. If the capacity of the conductor track varies, the circuit mounted on the conductor track is affected and has to be provided with compensation. This is all the more difficult, the larger the variations in the relative permittivity with temperature are. Since the films to be used according to the invention have relatively constant relative permittivity, even difficult circuits can be handled without compensation for the effects of capacitive changes with variations in temperature.

As electrically insulating films in the field of capacitors, the foils are additionally also interesting because vapour deposition of metals results in metal coatings of particularly high bond strength, the healing behaviour of capacitors containing these films is excellent in the case of electrical breakdown and extremely thin films of high quality can be obtained, in particular by the casting method and by additional stretching. The high quality of such films manifests itself, inter alia, in excellent mechanical properties. The thin films of high quality permit the production of very small capacitors.

As electrically insulating films in the field of engine insulation, the films to be used according to the invention are also interesting because they have high heat deflection temperature with low thermal oxidative aging and, in addition, are resistant to a number of chemicals.

The percentage data of the examples below relate, unless otherwise indicated, to the weight.

EXAMPLE 1

Properties of films from BPA/TER/ISO polyestercarbonates containing 74 mol-% of polyester fraction and a terephthalate/isophthalate unit ratio of 1/1

From 2,2-bis(4-hydroxyphenyl)propane, terephthalic acid dichloride, isophthalic acid dichloride, phosgene and p-isooctylphenol as chain limiter a polyestercarbonate containing 74 mol-% polyester fraction, 26 mol-% polycarbonate fraction and a terephthalate/isophthalate unit ratio of 1/1 was prepared by the continuous two-phase interface process described above (APE 74 K). The relative viscosity was 2.03 (measured in methylene chloride at c=5 g/l and 25° C.), the Na content (from salt not completely washed out) was 12 ppm, the glass transition temperature was 198° C. (measured by differential thermal analysis).

For comparison purposes, a polyestercarbonate of the same composition was prepared batchwise by the twophase interface process (APE 74 D). This had a relative viscosity of 2.09 (measured as above).

The APE 74 K and the APE 74 D were poured under the same conditions from their methylene chloride solutions to form 12 μm thick films and subsequently stretched at stretching temperatures of 215° C. as described above.

For APE 74 D an elongation at break of 83% was measured on the 12 μm film (unstretched). The maximum draw ratio was 1/1.9.

For APE 74 K an elongation at break of 114% was measured on the 12 μm film (unstretched). The maximum draw ratio was 1/2.3.

As is shown in Table 1 and Table 2, the dielectric strength $E_d$ and the dielectric loss factor were determined on 6 μm film of APE 74 K obtained by stretching the 12 μm film at 215° C. and with a draw ratio of 1/2.0.

The high values of dielectric strength contained in Table 1 which markedly increase above room temperature and do not drop off even at high temperatures are surprising. The good values are also surprising in particular because 30 they are achieved despite the relatively high salt content (12 ppm Na, v.s.). Equally surprising are the dielectric loss factors contained in Table 2 which are favourably low and decrease continuously with increase in temperature. Both properties are extremely useful in the electrical sector. The particularly high heat deflection temperature of the films of polyestercarbonates with high relative viscosities (such as, for example, in the case of APE 74 K, Tg=198° C.) is also surprising.

TABLE 1a (according to the invention)
Electrical dielectric strength of stretched 6 μm film of the polyestercarbonate APE 74K of Example 1 as a function of temperature Dielectric strength $E_d$ (kV/mm) median value $\tilde{x}$, DIN 53 841/VDE 0303 Part 2, IEC Publ. 243, electrode P6/P6, medium air, alternating voltage 50 Hz

| T (°C.) | Measurement series No. | | | | |
|---|---|---|---|---|---|
| | 1 | 2 | 3 | 4 | 5 |
| 23 | 315 | 315 | 313 | 320 | 318 |
| 50 | 385 | 388 | 380 | 392 | 390 |
| 75 | 355 | 448 | 395 | 385 | 430 |
| 100 | 347 | 412 | 381 | 410 | 405 |
| 125 | 353 | 392 | 375 | 387 | 390 |
| 150 | 338 | 380 | 382 | 375 | 395 |

TABLE 1b (comparison)
Electrical dielectric strength of stretched 8 μm film of bisphenol A polycarbonate (PC), of 7 μm film of a polysulphone of bisphenol A and dichlorodiphenylsulphone (PSU) and of stretched 12 μm film of polyethyleneterephthalate (PET)

Dielectric strength $E_d$ (kV/mm) median value $\tilde{x}$, DIN 53 841/VDE 0303 Part 2, IEC Publ. 243, electrode P6/P6, medium air, alternating voltage 50 Hz

| T (°C.) | PC | PSU | PET |
|---|---|---|---|
| 23 | 289 | 256 | 355 |
| 50 | 274 | 250 | 346 |
| 75 | 270 | 220 | 339 |
| 100 | 251 | 200 | 318 |
| 125 | 250 | 160 | 290 |
| 150 | 231 | 84 | 258 |

The comparison of Tables 1a and 1b shows the following:

(1) The dielectric breakdown strength of the film to be used according to the invention rises by approx. 70 kV/mm between 23° and 50° C. and maintains the level thereby reached approximately until at least 150° C.

(2) On the other hand, the dielectric breakdown strengths of the comparison films of PC, PSU and PET decrease continuously and considerably in the range from 23° to 150° C.

(3) The dielectric strength of the film to be used according to the invention has a considerably higher level than the comparison films of PC, PSU and PET, especially at higher temperatures such as e.g at 100° to 150° C.

We claim:

1. An electrically insulating film comprising a polycondensate containing 75-100 mol-% of bifunctional structural units of the formula (1) and optionally (2)

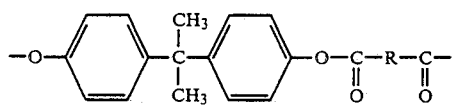 (1)

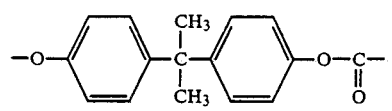 (2)

and 25-0 mol-% of bifunctional structural units of the formula (3) and optionally (4)

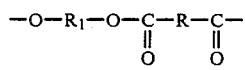 (3)

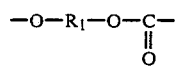 (4)

where the acid radicals —CO—R—CO— in the formulae (1) and (3) denote 75-100 mol-% of tere- and/or isophthalic acid radicals and 25-0 mol-% of radicals of other aromatic dicarboxylic acids and the radicals —O—R$_1$—O— in the formulae (3) and (4) denote radicals of diphenols other than the 2,2-bis(4-hydroxyphenyl)propane radicals contained in formulae (1) and (2), and the molar ratio of ester groups to carbonate groups in the polycondensates is 100/0 to 10/9.

2. A film according to claim 1, characterized in that the polycondensates are polyestercarbonates with an ester/carbonate group molar ratio of 95/5-10/90 and a relative viscosity of 1.7-3.0 (measured at c=5 g/l and 25° C. in methylene chloride) and are prepared by a continuous two-phase interface process, in which
   1. the diphenols, dissolved as diphenolate in an alkalinely aqueous phase, the acid chlorides, dissolved in a chlorinated hydrocarbon or a mixture of chlorinated hydrocarbons, and optionally phosgene are fed simultaneously and continuously into a first reactor effecting mixing,
   2. the two-phase mixture continuously discharged from the first reactor and also phosgene and optionally alkali-metal hydroxide and optionally further organic solvent are continuously fed into a second reactor effecting mixing.

3. In a dielectric capacitor containing an electrically insulating film, the improvement comprising the film is a film in accordance with claim 1.

4. In a dielectric capacitor containing an electrically insulating film, the improvement comprising the film is a film in accodance with claim 2.

5. In a conductor track film, the improvement comprising the film is a film in accordance with claim 1.

6. In a conductor track film, the improvement comprising the film is a film in accordance with claim 2.

* * * * *